Figure 1:
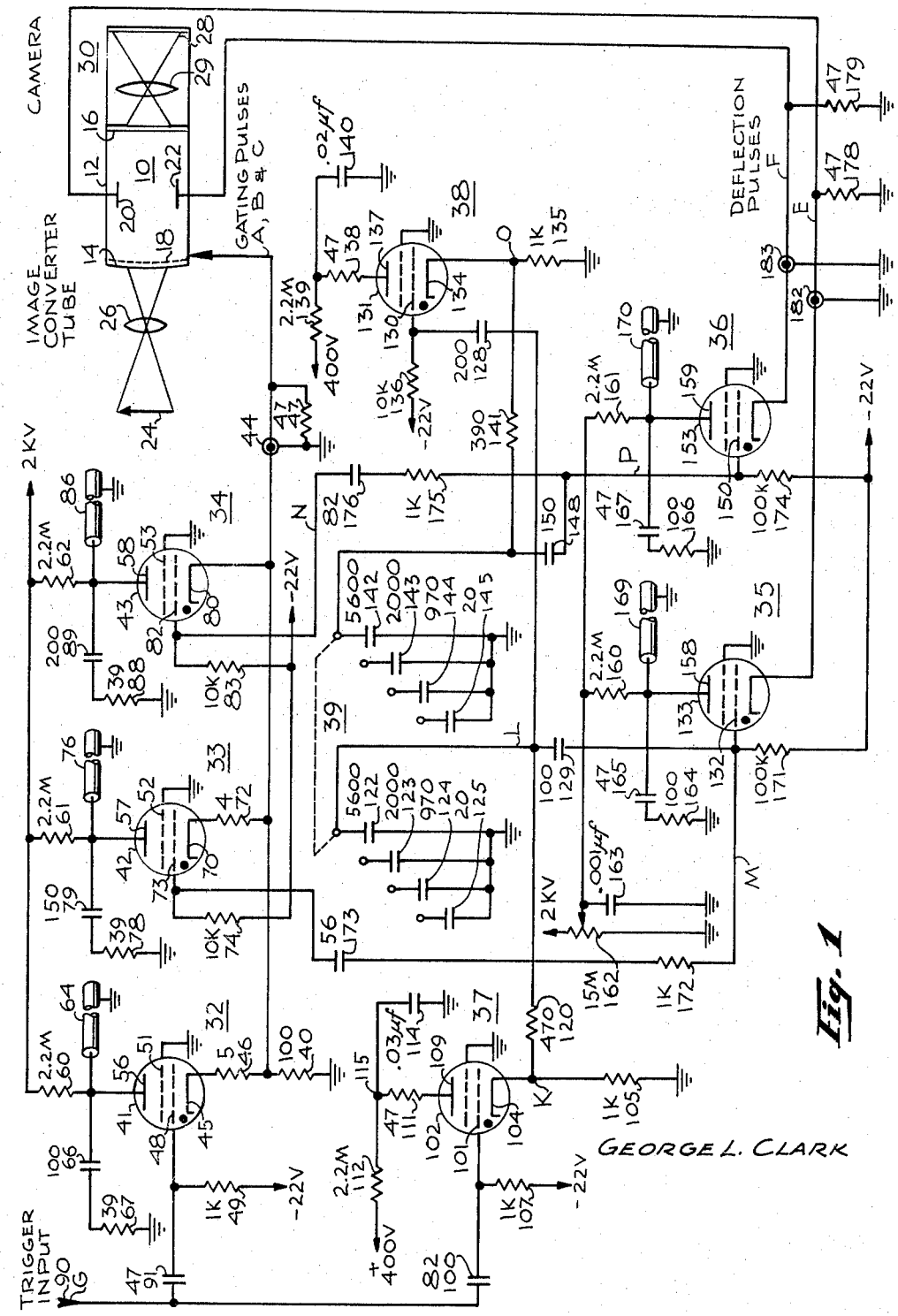

United States Patent Office 3,214,697
Patented Oct. 26, 1965

3,214,697
THYRATRON PULSE GENERATOR EMPLOYING PLURAL THYRATRONS HAVING GRADED IMPEDANCES FOR GENERATING CONSTANT AMPLITUDE OUTPUT PULSES
George L. Clark, Hawthorne, Calif., assignor to TRW Inc., a corporation of Ohio
Original application Dec. 4, 1958, Ser. No. 778,246, now Patent No. 3,096,484, dated July 2, 1963. Divided and this application Apr. 19, 1963, Ser. No. 303,697
3 Claims. (Cl. 328—67)

This invention relates generally to a control circuit, and more particularly to means for generating, through the use of thyratron circuits, one or more series of rectangular pulses, characterized by the trueness in the shape of the pulses, extremely fast repetition rate of the pulses in each series, and accurate timing between successive pulses in the same series as well as between the pulses in one of the series and those of the other series. The present application is a division of applications Serial No. 778,246, filed December 4, 1958, now patent No. 3,096,484.

The generation of one or more trains of rectangular pulses of short duration and rapid periodicity is essential for the proper operation of many kinds of electronic apparatus. Invariably, these pulses have to be accurately timed, both in duration and repition rate, with respect to each other. For example, there is one kind of electronic camera which utilizes a light amplfying image converter tube as a shutter for taking photographs of high speed transient phenomena such as are encountered in experimental plasma physics. The image converter tube has a photoemissive cathode at one end and a fluorescent screen at the other end, and means for accelerating towards and focusing on the screen, electrons that are emitted from the photoemissive cathode. A control grid positioned close to the photocathode can initiate and terminate the electron flow between the photoemissive cathode and the screen in response to voltage applied thereto. Moreover the voltage relationship between the cathode and grid will influence the sharpness of focus of the image on the screen. By means of an electron lens system, in the presence of proper voltage relationships of the tube elements, the electrons are made to converge at a crossover point before they reach the screen. A pair of deflection plates are positioned at the crossover point so that the image can be moved from side to side on the fluorescent screen.

In operation, light from the object is focused on the photoemissive cathode of the image converter tube. Normally the control grid is biased relative the the cathode to cut off the flow of electrons towards the fluorescent screen. An exposure is made by applying a positive gating voltage to the control grid for a very short time to cause a momentary flow of electrons towards the fluorescent screen. The image is thereby produced momentarily on the screen and with increased brightness due to the amplifying properties of the image converter tube. The amplified image appearing on the fluorescent screen is focused on a photographic film to record the data.

A fast series of exposures or frames can be taken by deflecting the electron image to a different position just prior to making each exposure and holding the image in that position during the exposure time. This is done by applying a rectangular voltage, or deflection pulse, to one of the deflection electrodes a short time prior to applying a rectangular voltage, or gating pulse, to the control grid, with the gating pulse terminating prior to the deflection pulse. It can be seen that if a series of frames are to be taken of high velocity transient phenomena, the gating and deflection pulses must be well-formed, of extremely short duration and repetition rate, and must be accurately timed with respect to each other.

To perform the functions of gating and deflection by the use of vacuum tube circuits would present many difficulties. In the first place, a vacuum tube is not a rectangular pulse device, and therefore elaborate circuitry involving many tubes is required to generate reasonably steeply rising, flat-topped pulses. Furthermore, the output from a vacuum tube tends to be at low voltage and high impedance, and extra precautions must be taken to preserve the pulse shape when driving a load having appreciable capacitive impedance, such as the electrodes of the image converter tube described above.

Mechanical switches are undesirable for producing the gating and deflection pulses because the voltages which can be used consistent with good pulse shape are too small and because there is too much jitter in the output.

It is known that thyratrons can produce rectangular pulses of superior rise time and flatness when used to discharge a delay line. Because a thyratron is basically a switch rather than an amplifier, it is possible to construct very simple pulse forming circuits. Furthermore, a thyratron is a high voltage low impedance device which can drive tube electrodes having substantial inter-electrode capacities with little or no deterioration in pulse shape.

However, thyratrons have various inherent properties. The de-ionization time, that is, the time during which the plate voltage must be removed to stop the discharge and permit the grid to regain control of the current flow, is a limiting factor as to the repetition rate of pulses which can be achieved with a single tube. Also, there is a slight delay between the application of a trigger pulse to the grid and the actual initiation of conduction through the tube. Furthermore, when the tube does fire, a sharp voltage pulse or spike is generated at the grid, and means must be provided to prevent this pulse from interfering with associated circuits.

Accordingly, it is a principal object of this invention to utilize thyratrons in novel circuit arrangements designed to take advantage of the useful properties of the thyratrons as well as those properties which have hitherto limited their use.

A further object is to use thyratrons in novel circuit arrangements to generate and control one or more series of rectangular voltage pulses, said pulses being extremely short in duration and also in their periodicity.

It is a further object to produce gating and deflection pulses for an electronic camera of the type described herein by the use of simplified circuits.

The foregoing and other objects are realized in accordance with the invention by arranging a plurality of thyratrons in novel pulse generating and timing circuits such that upon the application of a single external trigger pulse, two series of time spaced rectangular voltage pulses are produced, with the timing of one of the series being used to establish the timing of the other series.

In accordance with one aspect of the invention, one set of thyratrons are used to generate a first series of rectangular pulses of given time duration. The voltage spikes appearing at the grids of these thyratrons during conductance initiation are advantageously used to trigger a second set of thyratrons and thus generate a second series of rectangular pulses.

In accordance with another feature of the invention, selective filters are used between the tubes of the two sets to prevent the trigger pulses intended for the grids of the first set from reaching the grids of the second set while allowing the trigger pulses created by the first set to pass to the grids of the second set and at the same time preventing the spike pulses created by the grids of the second set from reaching the grids of the first set.

In accordance with another aspect of the invention the slight time delay between the application of a trigger pulse and the firing of each of the thyratrons in the second set is used to advantage to establish the timing of the second series of pulses with respect to the first series of pulses.

According to another feature of the invention, the thyratrons in the second set are connected in a novel circuit arrangement across a common load in such a way that upon triggering each one separately, first by an initial external pulse, and then successively by the trigger pulses generated in the second set as above-described, a series of rectangular pulses of very short duration and very high repetition rate are generated for applying gating voltages to the grid of an electronic camera. Because separate thyratrons are used for each pulse, the repetition rate is not limited by the de-ionization time of the thyratrons.

According to another feature of the invention, each of the rectangular pulses in the first series is made to expire after the expiration of the corresponding pulse in the second series. By initiating before, because of the above-mentioned slight delay, and terminating after the pulses in the second series, these pulses in the first series can be used to apply deflection voltages to the electronic camera energized by the second set of pulses.

Figure 2:
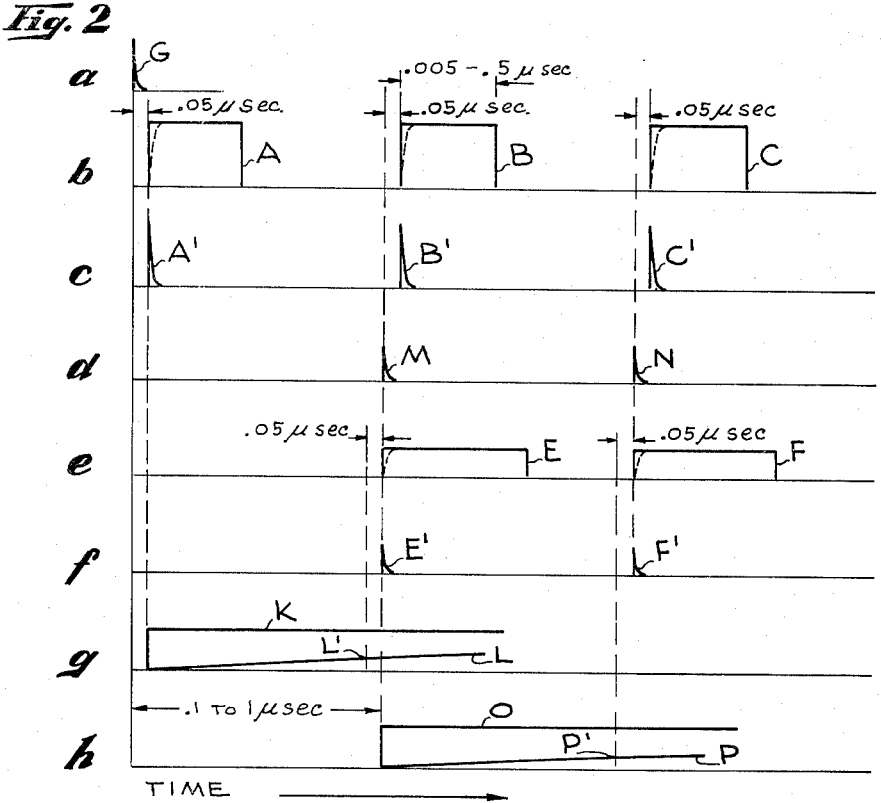
Figure 3:
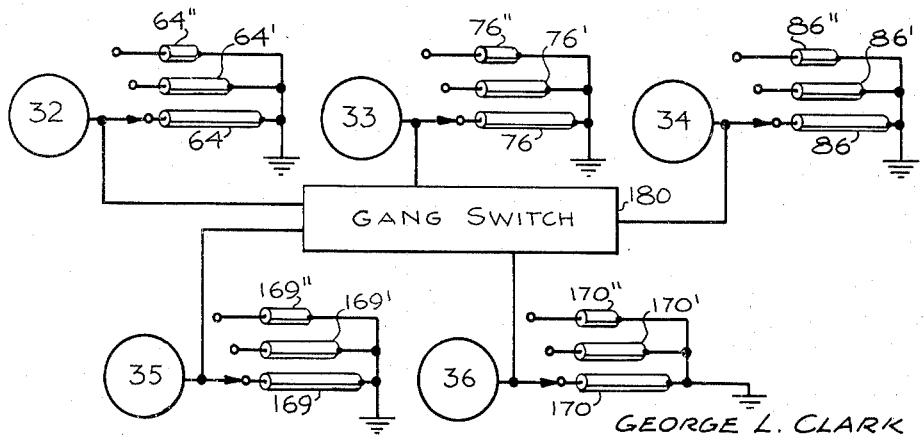

The subject matter which is regarded as this invention is particularly pointed out and distinctly claimed in the concluding portion of this specification. The invention, however, as to its organization and operation, together with further objects and advantages thereof will best be understood by reference to the following description taken in connection with the accompanying drawings, in which:

FIG. 1 shows a simplified circuit diagram of the present invention;

FIGS. 2a–h illustrate the timing relation of some of the waveshapes operative in the FIG. 1 circuit diagram; and FIG. 3 shows a block diagram of another embodiment of the invention shown in FIG. 1.

Referring now to the drawings in which like numerals refer to similar parts, FIG. 1 includes a schematic diagram including an electronic camera operable by one embodiment of the invention. The electronic camera includes as one of its principal components an image converter tube 10 which functions primarily as a high speed shutter. Another function of the image converter tube 10 is that of providing light amplification for the extremely short frame times involved in the high speed photographic apparatus of the invention.

The image converter tube 10 comprises essentially a cylindrical evacuated envelope 12 containing a photoemissive cathode or photo cathode 14 at one end, a fluorescent screen 16 at the other end, a control grid 18 adjacent to the photo cathode 14, and a pair of deflection plates 20 and 22 intermediate the control grid 18 and fluorescent screen 16. Certain other parts and components essential to the operation of the tube 10 are omitted for simplicity, since these are well known. For example, the tube 10 ordinarily contains additional electrodes such as an anode and focusing electrodes and also requires a high voltage supply. It will suffice to say that the tube may be one of the kind manufactured by RCA and bearing the developmental type number C 73435A. It should be kept in mind that the voltage relationships of the elements are critical if a sharp focusing is desired.

It will be apparent that with an object 24 such as gas, heated to a temperature of millions of degrees, for a period of a few millimicroseconds, the problem of obtaining desired data is acute. In the operation of the electronic camera for the purpose of photographing high speed transient phenomena, light from an object 24 is focused by a lens 26 onto the photoemissive cathode 14 of the image converter tube 10. The electron image emitted from the photo cathode 14 is normally prevented from reaching the fluorescent screen 16 by the application of a sufficiently high relatively negative blanking voltage to the control grid 18. In the particular setting of the invention this relative voltage is obtained by applying a positive two hundred volts to the cathode 14 and maintaining the grid 18 at zero volts.

Referring briefly to FIG. 2b, a rapid series of frames or exposures of the phenomena or object 24 can be taken by applying a series of rectangular voltage pulses, A, B and C to the control grid 18. The voltage pulses A, B and C are sufficiently positive (such as 500 volts) to unblank the control grid 18 and permit the electron image to be accelerated towards the fluorescent screen 16. The different frames or exposures may be reproduced side-by-side on the fluorescent screen by applying rectangular deflection voltage pulses E and F (FIG. 2c) to the deflection plates 20 and 22 respectively, between and during successive gating pulses. The amplified light images appearing on the fluorescent screen are then projected onto a photographic film 28 by means of a lens system 29. In practice the film 28 and the lens system 29 may be parts of a camera 30 of the type which allows rapid development of the exposed film 28.

In accordance with one aspect of this invention, a novel circuit arrangement is provided for generating the gating and deflection pulses A, B, C, E and F which are applied to the control grid 18 and deflection plates 20 and 22 respectively of the image converter tube 10. The electronic network employs a number of thyratron tubes connected in various novel ways to take advantage of the inherent properties of thyratron tubes.

The gating pulses A, B and C are produced by a gate pulse generator network including a number of pulse generator tubes. It is preferred for the repetition rates contemplated that there be one tube for each pulse to be generated. In the embodiment shown in FIG. 1, since there will be three exposures made, there will be three gating pulses and hence, three gate pulse generating circuits 32, 33 and 34 respectively.

The deflection pulses E and F are produced in a deflection pulse generating network which includes in this case, two deflection pulse generating circuits 35 and 36 respectively. Associated with the gate pulse generating and deflection pulse generating circuits are a pair of trigger pulse generator circuits 37 and 38 and a framing interval selector switch 39 which control the repetition rates of the gating and deflection pulses or the time interval between frames. In order to provide desirable inherent characteristics it is preferred that all of the thyratrons used within these circuits 32–38 are screen grid xenon thyratrons such as type 2D21.

In accordance with one feature of the invention all of the three gate pulse generating circuits 32–34 are connected to a common cathode load resistor 40 so that upon triggering each of the gate pulse generator tubes 41, 42 and 43, successively, successive gate pulses A, B and C may be produced across the load resistor 40 and applied through a shielded cable 44 to the grid 18 of the image converter tube 10. This type connection eliminates wave deformation which is likely to occur in any arrangement containing rectifiers for isolating each of the gate pulse generating circuits.

In more detail, the first gate pulse generator tube 41 has its cathode 45 connected in series with the parallel impedances of the load resistor 40 and the shielded cable 44 through a voltage dropping resistor 46, the function of which will be explained below. It should be noted that a resistor 47 is connected across the shield cable 44 at the grid (18) end thereof to prevent any transient reflection. As is well known the impedance of the resistor 47 and the cable 44 should be matched.

A control or ionizing grid 48 of the tube 41 receives a negative 22 volt bias through a relatively large grid leak resistor 49 to prevent firing of the tube. In order to provide desirable ionizing characteristics, the screen grids 51, 52 and 53 of the tubes 41, 42 and 43 are maintained at the ground potential. The plates 56, 57 and 58 of the tubes 41, 42 and 43 are connected to a 2,000 volt supply through the high resistance plate resistors 60, 61 and 62. A delay line 64, which may be a suitable length of coaxial transmission line, is connected between the plate 56 and ground. Also connected between the plate 56 and ground is an R.C. wave shaping circuit consisting of a capacitor 66 and resistor 67 connected in series. Since the focusing of the image tube 10 is dependent on the relative voltages of the elements this R.C. circuit must be carefully selected to provide a proper waveshape as will be descussed below.

Similarly, the second gate pulse generator tube 42 has its cathode 70 connected through a series resistor 72 to the load resistor 40. The control grid 73 is connected to negative 22 volt bias supply through the grid leak resistor 74. A delay line 75 is connected between the plate 57 and ground and a serially connected resistor 76 and capacitor 79 are provided between the plate 57 and ground. The third gate generator tube 43 has its cathode 80 connected directly to the load resistor 40 and its control grid 82 is connected to the negative 22 volt bias supply through a grid leak resistor 83. A third delay line 86 is connected between the plate 58 and ground and a third resistor 88 and capacitor 89 combination is connected between the plate and ground.

The manner in which gating pulses are produced by the gate pulse generator network will now be described with the aid of FIG. 2 which is a simplified diagram of certain wave shapes within the network. Initially, since the plate resistor 60 has a resistance sufficient to reduce current flow within the tube 41 to below a conductance sustaining level, the cathode of the tube 41 is maintained in a nonconducting condition by the 22 volt negative bias applied to its control grid 48. Under these conditions, the first delay line 64 is charged up through the voltage impressed on the plate resistor 60 at the plate supply voltage 2 kv. and with no current flow the voltage at the top of the cathode load resistor 40 is at ground potential (as shown in FIG. 2b). If a positive trigger pulse G (FIG. 2a) is applied from a source 90 through a capacitor 91 to the grid 48, the tube 41 quickly (after .05 $\mu$sec.) ionizes and the voltage across it drops from 2 kv. to a very low value. Usually the trigger pulse source 90 will initiate the trigger pulse G in response to phenomena occurring relative to the object 24.

Since the plate resistor 60 (2.2 megohms) is much larger than the effective impedance of the delay line 64 (50 ohms) and the matched cathode load resistor circuit (resistors 40, 46 and 4) during tube conductance, the discharge circuit portion (40–56) is not affected substantially by the charging circuit portion (60). Thus, when the tube fires, the voltage at the plate 56 is reduced sharply. This sudden change of voltage at one end of the delay line 64 starts a negative voltage wave front traveling along the length of the delay line 64. When the wave front reaches the open end of the line, it is reflected and travels in the opposite direction back to the starting end. For the generation of a single rectangular pulse only one reflection is desired, therefore (neglecting the very small impedance of the conducting gas tube 41) requiring that the cathode resistors 40, 46 and 47 be made equal to or slightly less than the characteristic impedance of the delay line 54 (50 ohms). For such values of cathode load resistance, the plate voltage is reduced to one-half or less of the supply voltage (2 kv.) while the cathode voltage as sensed across the load resistor 40 rises to one-half or less of the supply voltage at the beginning of the delay line wave propagation phenomena to initiate the desired gate pulse A (FIG. 2b) on the shielded cable 44. Depending on the positive bias provided at the photoemissive cathode 14, the voltage of the gating pulse A may be of the order of 500 volts.

During the transmission of the pulse A, a negative voltage wave equal to one-half or more of the supply voltage travels down the delay line 64, is reflected, and travels back in the opposite direction. Half or more of the voltage on the delay line 64 is thereby discharged while the wave propagation phenomena is moving in one direction and the delay line is completely discharged or charged slightly to the other polarity when the wave returns in the opposite direction. At the instant the plate voltage reaches zero or a negaive value, the tube 41 ceases to conduct whereby the gate pulse A is terminated. During these wave phenomena on the delay line 64 a signal is derived across the resistor 40 and transmitted by the cable 44 to the grid 18.

The thyratron tube 41 is heavily ionized at this time and would continue to conduct except that the current flow of less than 1 milliampere through the 2.2 megohm resistor 60 is insufficient to sustain ionization of the gas tube 41. Thus, the tube starts to de-ionize, whereby the grid 48 will regain control. Since, after de-ionization, no current can flow through the tube, the delay line 64 charges in approximately .01 second.

Due to some slight stray inductance in the discharge circuit the leading edge of the rectangular phase A tends to be slightly rounded (as shown in dashed lines FIG. 2b). To correct for this and provide sharp leading edges, an RC circuit is connected in each plate circuit. The effect of the RC circuit 66–67 is to add a small pulse A' (FIG. 2c) to eliminate the rounded portion (indicated in dashed lines, FIG. 2b) of the rectangular pulse A. The capacitor 66 is of the proper size, such as 100 $\mu\mu$f. and the resistance 67 is of the proper size, such as 39 ohms, when combined with the capacitance 66 to raise the wave front vertically by the proper amount and make the added pulse A' decay at a proper rate. The added pulse A' thereby fills in the gap in the original rounded wave front to produce a more nearly rectangular wave. Similar additions B' and C' are provided by RC circuits 78–79 and 88–89 for pulses B and C respectively. With this circuit arrangement a gate pulse is provided which will enhance focusing of the image tubes 10 during the entire period of conductance.

As a result of this sequence of events, a positive rectangular voltage gate pulse A appears across the cathode load resistor 40. Actually the "cathode load resistance circuit" includes the impedance of the parallel shielded cable 44 and the resistor 47. The pulse has a very steep front due to the sharp rise in the current when the gas tube conducts. The duration of the gate pulse A is the time required for the voltage wave front to travel down the length of the delay line 64 and back again to the starting end and in magnitude is equal to one-half or less of the initial voltage across the delay line 64.

A convenient delay line for generating pulses of the order of .005 to 1.0 microsecond can be made from a length of standard 50 or 90 ohm coaxial cable (with the magnitude of the resistors 40, 46 and 47 selected accordingly). Thus, the output gate pulse A is available at a low impedance level suitable for transmission through the cable 44 for driving a load, such as the grid 18, with appreciable input capacity and without distorting the pulse shape. The pulse A is also generated at such a voltage magnitude (500 volts) that no amplification is necessary. All of these factors contribute greatly to simplification of the circuit.

As mentioned previously, thyratrons have a long de-ionization time so that it would not be feasible to apply another trigger pulse to the first generator tube in order to produce a second gate pulse, in less than 1 ten-millionth of a second which is the order of repetition rate desired during at least some of the operating conditions contemplated.

To generate such a fast sequence of rectangular pulses, the three gate pulse generator tubes 41, 42 and 43 are connected in parallel across a common load resistance 40 and separate trigger pulses are applied to the various grids of the tubes. It will be shown below how the second and third gate pulse generator tubes derive their trigger pulses. It will suffice at this time to say that they receive trigger pulses at predetermined intervals so that a series of three rectangular gate pulses A, B and C are developed across the load resistor 40. The second and third gate pulses B and C are generated in substantially the same manner as was described for the first pulse A.

After the first gate pulse A has been formed and while the second pulse B is being formed by the second generator tube 42, the first tube 41 is still ionized and thus is in condition for a small amount of conduction backwards through the tube. Hence the pulse B which appears at the output of the second tube 42 raises the voltage of the cathode 45 of the first tube 41 to a positive magnitude with respect to the plate 56 whereby a small part of the current supplied by the delay line 76 passes through the first tube 41. As a result, the output pulse B from the second tube 42 tends to be smaller in amplitude than the pulse A of the first tube 41. In the same way, the pulse C tends to leak off through both tubes 41 and 42. In order to make the amplitude of each of the pulses A, B and C the same so that the image tube 10 will be properly focused, a voltage divider network is used to reduce the pulses A and B. The voltage divider network in the first tube 41 consists of the resistor 46 in series with the load resistor 40. Also the series resistor 72 in the cathode circuit of the second tube 42 reduces the voltage pulse B generated by the second tube 42 to a value equal to the pulse C which will be generated by the third tube 43. The result of combining three pulse generator circuits in the manner shown is that the three pulses A, B and C can be formed with a repetition rate of less than 1/10 microsecond, in spite of the fact that the time for the thyratrons to recover is of the order of 1/10 millisecond.

In order to provide proper and controlled spacing between the first and second pulses, the same trigger pulse C that is applied to a first gate pulse generating circuit 32 through the capacitor 91 is also applied through the capacitor 100 to a grid 101 of the first trigger pulse generator tube 102. The tube 102 of the trigger pulse generator circuit 37 has its cathode 104 connected to ground through a cathode load resistor 105 and its grid 101 connected to a negative bias supply through a grid leak resistor 107. The plate 109 of the trigger pulse generator tube 102 is connected to positive 400 volts through the two resistors 111 and 112 connected in series. Resistor 112 is a charging resistor large enough to stop conduction after capacitor 114 discharges. Resistor 111 serves to limit the discharge current of capacitor 114 and lengthen the wave form produced by the tube circuit. The capacitor 114 is connected at one terminal to the voltage tap or junction 115 between the two plate resistors 111 and 112 and at the other terminal to ground. The impedance of the resistor 112 (2.2 megohms) is such that the discharging current flow of the capacitor 114 will not be affected substantially by the 400 volt supply.

For the time constants of this invention, the output impulse wave form of the first trigger pulse generator circuit 37 appears as a step voltage K (FIG. 2) and is connected from the cathode load resistor 105 to an integrating network including a series resistor 120 and one of a plurality of capacitors 122–125 connected through the multiple contact framing interval selector switch 39 between the resistor 120 and ground. An output ramp type voltage trigger pulse L (FIG. 2g) of the integrating circuit network 120–125 is coupled through the capacitors 128 and 129 respectively to a grid 130 of a thyratron tube 131 of the second trigger pulse generator circuit 38 and to a grid 132 of a thyratron tube 133 of the first deflection pulse generating circuit 35. The second trigger pulse generator circuit 38 is similar to the first (37) and has its cathode 134 connected to ground through a cathode load resistor 135 and its grid 130 connected to the negative bias supply through a grid resistor 136. The plate 137 of the second trigger pulse generator tube 131 is connected to a positive 400 volt supply through two resistors 138 and 139. A capacitor 140 is connected between ground and the junction of the two resistors 138 and 139 to provide a desired wave form O (FIG. 2h) across the load resistor 135.

The output wave form O of the second trigger pulse generator circuit 38 is connected electrically from the cathode load resistor 135 to an integrating network including a resistor 141 and one of a plurality of capacitors 142–145 connected by the framing interval selection switch 39 between the resistor 141 and ground. The output of the integrating network 141–145, a ramp trigger pulse P, is connected by electric circuit means such as a capacitor 148 to the grid 150 of the second deflection pulse generator tube 153.

The two deflection pulse generators are similar to the gate pulse generators but differ to the extent that they are not connected to a common load and therefore will not tend to affect relative current flow during ionization periods, as discussed above in connection with resistors 46 and 72. In addition the two deflection pulse generators each have their plates 158 and 159 connected through plate load resistors 160 and 161 respectively to a 2.000 volt supply through a potentiometer 162 and smoothing capacitor 163 which serve as a deflection control to vary the amplitude of the deflection pulses E and F on the deflection plates 20 and 22.

In order to correct for stray inductance which tends to cause the leading edge of the pulses E and F to be rounded (shown in dashed lines, FIG. 2e) RC circuits 164–165 and 166–167 are connected to the plates 158 and 159 respectively to function similarly to the RC circuit 66–67 discussed above in connection with the gate pulse generating circuit 32. These RC circuits 164–165 and 166–167 provide the waveforms E' and F' (FIG. 2f) to cause the leading edges of the deflection pulses E and F to be sharp. This is particularly desirable in the deflection pulses E and F, because any variation of the deflection pulse during a gate pulse transmission would obviously blur a picture.

The delay lines 169 and 170 respectively are connected to the plates 158 and 159 and function in a manner similar to the delay line 64 discussed above. It is requisite that the delay lines associated with each of the deflection pulse generating circuits 35 and 36 are somewhat longer than those used in the gate pulse generating circuits 32, 33 and 34 in order to produce the deflection pulses E and F which are of longer duration than the gating pulses B and C. Only in this way is it feasible to provide a deflection of the electron flow which will not vary during transmission of a gate pulse.

Referring now to the triggering of the second gate pulse generating circuit 33, the grid circuits of the first deflection pulse generating circuit 35 (including a large grid leak resistor 171 connected between the grid 132 and 22 volt grid bias voltage), and the second gate pulse generating circuit 33 are coupled together through an RC filter comprising a resistor 172 and a capacitor 173 connected in series. Similarly, in connection with triggering of the third gate pulse generating circuit 34, the grid circuits of the second deflection pulse generating circuit 36 (including a large grid leak resistor 174) and the third gate pulse generating circuit 34 are coupled together through an RC filter including a resistor 175 and a capacitor 176 connected in series. These connections are made as will be seen, in order to utilize the voltage spike trigger pulses M and N (FIG. 2d), which appear at the thyratron grids, upon firing the deflection pulse generators as trigger pulses for firing the gate pulse generators. Moreover, in the event that the tube 131 is not conducting at the time of initiating conductance of the tube 133, the trigger pulse M will be effective at the grid 130 of the second trigger pulse generator circuit 38 to assure firing of that tube within the .05 μsec. of the time of the firing of the first deflection pulse generator circuit 35.

The operation of the trigger pulse generating circuits 37 and 38 and the deflection pulse generating circuits 35 and 36 will now be described in detail. The external trigger pulse G (FIG. 2a) is applied to the grid 101 of the first trigger pulse generator tube 102 through the coupling capacitor 100. After the inherent .05 μsec. delay, the trigger pulse G causes initiation of conductance in the normally nonconducting trigger pulse generator, thus allowing the capacitor 114 to discharge through a relatively long RC time constant circuit including the plate resistor 111 and cathode load resistor 105. The voltage wave K produced across the cathode load resistor 105 is a step function with an exponential decay, but for the framing interval of the speeds contemplated, it may be considered to be a simple step voltage or rectangular voltage. This rectangular voltage wave K is integrated by the resistor-capacitor combination 120–125 to produce a relatively slow rising (such as 40 volts per microsecond) voltage which is an exponential rising voltage used as the ramp trigger pulse L (FIG. 2g) for the second trigger pulse generating circuit 38 and the first deflection pulse generating circuit 35. At the end of the time determined by the RC time constant of the integrating circuit 120–125 the ramp trigger pulse L will reach a sufficient value, L′, relative to the 22-volt negative bias to cause firing of the first deflection pulse generator tube 133 and the second trigger pulse generator tube 131.

In accordance with one aspect of the invention, since it is not desired to trigger the gate pulse generating circuit 33 with this ramp trigger pulse L, selective filtering circuit between the grid circuits of the first deflection pulse generator tube 133 and the second gate pulse generator tube 42 includes components carefully selected to inhibit passage of such a pulse. Relative to the ramp trigger pulse L and the grid 132, the selective filtering network comprises a low impedance coupling circuit including relatively low impedance coupling capacitor 129 and relatively high impedance grid resistor 171 in the deflection pulse generating circuit 35 while, relative to the pulse L and the grid 73, the network provides high-pass filter circuit including the relatively high impedance coupling capacitor 173 and relatively low impedance grid leak resistor 74 in the gate pulse generating circuit 33. For relatively low frequencies, such as the ramp trigger pulse L, the capacitor 129 has a low impedance relative to the resistor 171 so that it will pass to the grid 132 these relatively slow rising ramp trigger pulses. However, the capacitor 173 has a high impedance relative to the resistor 74 and will inhibit passage of the ramp trigger pulse L. Therefore, while the ramp trigger pulse L will reach the grid 132 of the first deflection pulse generator tube 133, it will be blocked from the grid 73 of the second gate pulse generator tube 42.

When the ramp trigger pulse L reaches the voltage L′ sufficient to overcome the 22 volt bias on the grid 132 enough to initiate conductance in the tube 133, the first deflection pulse generator ionizes and will generate the rectangular deflection pulse E (FIG. 2a) in its cathode circuit which has a duration, dependent upon the length of the delay line 169 in its plate circuit. At the same instant that the first deflection pulse generator fires, the sharp voltage spike trigger pulse M appears at its grid 132 as is characteristic of the thyratron tubes. Being made up primarily of high frequency components, this voltage spike trigger pulse M is of the type which will be passed to the grid 73 of the second gate pulse generator tube 42 through the selective coupling filter 74 and 173 in its grid circuit. About 50 millimicroseconds after the grid spike trigger pulse M appears on the grid 73 of the second gate pulse generator or tube 42, this tube will be ionized and initiate the generation of the second gate pulse B. Thus, the inherent time delay between the application of a spike trigger pulse M to the thyratron tube 42 and the actual time for firing is used to establish a time delay (of .05 μsec.) between the initiation of the first deflection pulse E and the second gating pulse B (see FIGS. 2c, d and b respectively).

It is contemplated that substantial variation of the voltage of the grid 132 might vary slightly the waveshape of the deflection pulse E. Therefore, in order to block the voltage spike (not shown in FIG. 2), which appears on the grid 73 during initial conductance of the second gate pulse generator tube 42 from the grid 132 of the first deflection pulse generator, the resistor 172 is inserted in series with the capacitor 173 connecting the two grid circuits. This resistor 172 is small (1,000 ohm) compared to the resistance of the grid resistor 74 (10,000 ohms) and therefore has little effect during nonconductance conditions of the tube 42 on the grid spike trigger pulse M which is passed from the first deflection pulse generator tube 133 to the second gate pulse generator tube 42. However, it will be observed that while the second gate pulse generator tube 42 is in the conducting condition, the first deflection pulse generator tube 133 is also conducting, therefore the grid resistance of the latter tube (133) is very low (such as 1 ohm) as compared to the series resistance 172. As a result, the grid spike which is generated by the second gate pulse generator tube 42 is dropped across the series resistor 172 rather than across the grid circuit of the first deflection pulse generator tube 133.

It will be recalled that at the time that the first deflection pulse generator tube 133 was fired, the second trigger pulse generator tube 131 was fired by the same ramp trigger pulse L so as to generate across its load resistance 136 the rectangular portion of a step function wave O which is integrated to provide a second slow rising ramp trigger pulse P (FIG. 2h) in the output of the second trigger pulse generator. The ramp trigger pulse P is applied to the grid 150 of the second deflection pulse generator tube 153 to initiate the second deflection pulse F and by the occurrence of the spike trigger pulse N through the filter circuit resistance 175 and capacitor 176, to initiate shortly thereafter the third gate pulse C. Thus the two deflection pulses E and F are applied separately through shielded cables 182 and 183 to the deflection plates 20 and 22 respectively of the image converter tube 10. It should be noted that each of the cables 182 and 183 are provided with a matched, nonreflection producing resistor thereacross connected at the end adjacent to the deflection plates 20 and 22 respectively. These resistors 178 and 179 also provide the function of carrying the current necessary for conductance of the tubes 133 and 153, and in combination with the cables 182 and 183 are equivalent to cathode load resistance.

According to a preferred embodiment, the first gate pulse A is applied to the grid 18 of the image converter tube while the deflection plates 20 and 22 have no deflection voltage applied thereto. Under these circumstances, the first exposure will appear in the middle of the fluorescent screen 16. After the first exposure the first deflection pulse E is applied to one of the deflection plates (20) to move the image to one side of the fluorescent screen 16. During the interval while the first deflection pulse E is applied the second gate pulse B is applied to the grid 18 to produce the second exposure, the second frame appearing to one side of the first frame. After the second exposure the first deflection pulse E is terminated and second deflection pulse F is applied to the other deflection plate (22) to move the image to the opposite side of the fluorescent screen 16. During the interval while the second deflection pulse F is applied, the third gate pulse C is applied to the grid 18 whereby the third exposure is made to produce an image on the other side of the first two images. In this way, three images can be produced side by side on the fluorescent screen 16.

Obviously in an image converter tube wherein both horizontal and vertical deflection plates may be used, three sets of three (or nine) images might be produced by modifying the above circuit to include more gate pulse generators of the type referred to in the tube circuits 32, 33 and 34. Of course this would result in an increased number of ramp trigger pulse generators and deflection pulse generators operated in accordance with the teachings of the above discussion.

Referring again to FIG. 1 and particularly the framing interval selector switch 39, the framing rate or repetition rate may be varied by changing the values of capacitances between 20 and 5600 μμf. in the integrating circuits by means of the switch 39. However, it is noted that even though the framing rates may be changed, there remains a constant time delay (.05 μsec.) between the initiation of the deflection pulses E and F and the corresponding gating pulses B and C. This relationship is maintained and will limit the most rapid repetition rates to approximately .06 microsecond per frame. Moreover, the gas tube characteristics may prevent rise times of less than .003 μsec. Another limiting feature in the particular environment of the invention may be the electron transit time phenomena within the image tube 10 between the cathode 14 and the point at which the electron beam is deflected.

Also it is within the contemplation of the present invention that the gating pulses may be varied between 5 millimicroseconds and 500 millimicroseconds by proper selection of the delay lines 64, 76 and 86. A ganged selector switch 180 such as a coaxial switch which would accomplish this easily is shown in the block diagram (FIG. 3) and is adapted to connect each of the delay lines 64, 76 and 86 or shorter delay lines 64', 76', 86', or 64'', 76'' and 86''. If during the transmission of extremely short gate pulses (such as .005 μsec.) it is desired to increase the pulse repetition rate to a maximum, it is also feasible to provide for selectively changing the length of delay lines 169 and 170 to 169' and 170' or 169'' and 170'' to be comparable to the change in shorter delay lines 64', 76' and 86' or 64'', 76'' and 86''. With this arrangement it is possible to provide a series of three picture frames having an overall time duration of the order of 200 millimicroseconds which might be desirable for certain very rapid phenomena. If, as discussed above, nine gating pulses are to be provided, the nine pictures resulting could be made to record phenomena occurring in less than one-half of a microsecond.

While there is shown and described a particular embodiment of this invention, further modifications and improvements may occur to those skilled in the art. For instance, certain of the circuit arrangements disclosed herein may be useable to provide desirable characteristics in networks other than that described. Moreover, it may be desirable to provide inter-related wave functions of the type obtainable from the above disclosure for purposes other than the operation of an electronic camera type device. It is desired, therefore, that this invention should not be limited to the particular forms shown, and it is intended by the appended claims to cover all modifications which do not depart from the true spirit and scope of this invention.

What is claimed is:

1. A control circuit including a pair of thyratron pulse generator tubes for providing a pair of rectangular pulses with a time duration between the termination of the first of the pulses and the initiating of the second being less than the time necessary for de-ionizing of the first of the pair of thyratrons, comprising; a cathode load resistance circuit, electric circuit connections of different impedance values between the cathode load resistance circuit and the cathode of each of the pair respectively whereby current flow in either of the pair will cause a voltage across the cathode resistance circuit; a delay line connected in the plate circuit of each of the pair to be discharged during conductance therethrough, the length of each delay line being chosen to provide a desired pulse duration, the value of the cathode resistance circuit being of a magnitude enhancing discharge of each delay line with substantially no oscillations whereby pulses thereacross will each be rectangular with a substantially constant magnitude; the impedance of the electric circuit connection between the cathode load resistance circuit and the cathode of the first of the pair being higher than the impedance of the electric circuit connection between the cathode load resistance circuit and the cathode of the second of the pair by an amount sufficient to reduce the associated pulse magnitude created across the cathode resistance circuit during conductance of the first of the pair an amount comparable to the reduction created across the cathode resistance circuit during conductance of the second of the pair because of back conductance of the first of the pair.

2. A control circuit including a plurality of thyratron pulse generating circuits each including a delay line connected in the plate circuit to be discharged during conductance of the thyratron to produce a series of rectangular pulses with the time duration between the termination of at least some of the series of pulses and the initiation of the last pulse being less than the time duration necessary for de-ionization of at least some of the thyratrons; a signal deriving circuit means comprising; a cathode load resistance circuit common to each cathode of the plurality of thyratrons for deriving a rectangular wave thereacross during discharge of each of the delay lines, and preselected impedances of graded values connected between the cathode load resistance circuit and each of the respective cathodes of the thyratrons except the last thereof, said impedances diminishing in value from the first to successive firing thyratrons, to reduce in magnitude each of the rectangular pulses associated therewith by an amount to provide a series of pulses substantially equal in magnitude to the pulse produced across the cathode load resistance circuit in response to current flow in the last of the thyratrons to fire which last thyratron is effected by the back conductance in other of the thyratrons.

3. A wave form generating circuit comprising: a pair of thyratron pulse generator tubes; current limiting means connected between a plate of each tube respectively and a power supply to prevent current flow through each tube in response to the voltage of the power supply, of a magnitude which will sustain ionization of the tube; electric storage means connected in circuit with each said plate respectively to maintain conductance sustaining current flow during ionization for a predetermined time; electric circuit means for supplying separate ionizing trigger pulses to a control grid of each of the pair; a cathode load resistance circuit; and electric circuit connections between the cathode load resistance circuit and a cathode of each of the pair, the impedance of the electric circuit connection between the cathode load resistance circuit and the cathode of the first of the pair being higher than the impedance of the electric circuit and the cathode of the second of the pair by an amount sufficient to cause voltage waveforms of substantially the same amplitude to be developed across the cathode load resistance circuit upon successive firings of the thyratron of said pair.

References Cited by the Examiner

UNITED STATES PATENTS 2,646,503  7/53  Winter _____ 328—67 X
2,655,595  10/53  Chambers _____ 328—67 X ARTHUR GAUSS, *Primary Examiner.*